(12) United States Patent
Lee et al.

(10) Patent No.: US 7,265,902 B2
(45) Date of Patent: Sep. 4, 2007

(54) DISPLAY APPARATUS SWITCHABLE BETWEEN A TWO-DIMENSIONAL DISPLAY AND A THREE-DIMENSIONAL DISPLAY

(75) Inventors: Chun-Yu Lee, Tu-Cheng (TW); Ming-Chiang Tsai, Tu-Cheng (TW); Tsung-Wei Chiang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 163 days.

(21) Appl. No.: 10/951,206

(22) Filed: Sep. 27, 2004

(65) Prior Publication Data
US 2005/0041162 A1    Feb. 24, 2005

(30) Foreign Application Priority Data
Nov. 7, 2003    (TW) ................. 92131176 A

(51) Int. Cl.
*G02B 27/22*    (2006.01)
(52) U.S. Cl. ............ 359/463; 359/464; 359/359; 359/462
(58) Field of Classification Search ............ 359/462, 359/463, 464; 345/7, 32; 353/7; 348/51, 348/56, 59, 54, 55, 57, 58, 60
See application file for complete search history.

(56) References Cited
U.S. PATENT DOCUMENTS

| | | | |
|---|---|---|---|
| 5,850,269 A | 12/1998 | Kim | |
| 5,907,312 A | 5/1999 | Sato et al. | |
| 5,966,105 A * | 10/1999 | Gundlach | 345/32 |
| 6,014,164 A | 1/2000 | Woodgate et al. | |
| 6,049,424 A | 4/2000 | Hamagishi | |
| 6,061,179 A * | 5/2000 | Inoguchi et al. | 359/464 |
| 6,302,541 B1 * | 10/2001 | Grossmann | 351/240 |
| 6,459,532 B1 | 10/2002 | Montgomery et al. | |

\* cited by examiner

*Primary Examiner*—Audrey Chang
(74) *Attorney, Agent, or Firm*—Jeffrey T. Knapp

(57) ABSTRACT

A display apparatus (20) includes a display panel (22) having pixels, a movable light shielding plate (23), and a light deflection plate (24). The light shielding plate is interposed between the display panel and the light deflection plate, and includes strip-shaped transparent portions (231) and strip-shaped non-transparent portions (232) alternately arranged thereat. The light deflection plate includes a transparent substrate (243) having light deflection elements (2411) formed thereon. The light deflection elements are arranged in rows, which are spaced apart at predetermined intervals. The light deflection elements respectively correspond to individual pixels of the display panel. When the light shielding plate is positioned so that the transparent portions correspond to the light deflection elements, the light deflection elements operate to provide 3D images. When the light shielding plate is positioned so that the non-transparent portions correspond to the light deflection elements, the light deflection plate operates to provide 2D images.

20 Claims, 5 Drawing Sheets

DISPLAY APPARATUS SWITCHABLE BETWEEN A TWO-DIMENSIONAL DISPLAY AND A THREE-DIMENSIONAL DISPLAY

BACKGROUND OF THE INVENTION

1. Field of the Invention

The present invention relates to an electronic display apparatus, and especially to a display apparatus that can switch between a two-dimensional (2D) display mode and a three-dimensional (3D) display mode.

2. Description of Prior Art

Devices and means for displaying dynamic 3D images are under continuous development. These devices take advantage of the primary way that humans sense depth-binocular disparity. Because human eyes are offset from each other, humans see a slightly different image of the same object with each eye. The amount and shape of the difference between the two images is what the brain interprets as depth. 3D displays create this effect by producing two slightly different images of the same data. By directing each image into a separate eye, and finely controlling the differences between the images, the display leads the brain into interpreting the two images as the one object seen in 3 dimensions.

3D displays which require the observer to wear special glasses are quite well known. These displays present two different images in the same plane. The glasses select which of the two images is visible to each of the observer's eyes.

A 3D display apparatus in a binocular parallax mode (parallax barrier mode) is conventionally used as a 3D display apparatus which allows an observer to view a stereoscopic image without special glasses.

FIG. 4 shows a basic structure of a display section 110 of a 3D display apparatus used in the conventional parallax barrier mode. The display section 110 includes an image display panel 101, and a slit array panel 102 disposed in front of the image display panel 101. As shown in FIG. 5, the slit array panel 102 includes a plurality of strip-shaped non-transparent portions 105 and a plurality of strip-shaped transparent portions 106 arranged in parallel alternating fashion. A width of each non-transparent portion 105 is T, which also represents the distance separating adjacent transparent portions 106.

In the case where a double-window display is provided, a plurality of strip-shaped images (L) for the left eye and a plurality of strip-shaped images (R) for the right eye are alternately disposed on the image display panel 101, as shown in FIG. 6. A distance V is defined between adjacent strip-shaped images (L). The distance V is set to be slightly larger than the distance T. This configuration enables stereoscopic viewing. More specifically, as shown in FIG. 7, the strip-shaped images (L) for the left eye and the strip-shaped images (R) for the right eye displayed on the image display panel 101 are separated through the slit array panel 102 disposed in front of the image display panel 101, so as to converge to two different predetermined points. Therefore, by setting a left eye 103 and a right eye 104 of an observer at the points to which images are converged, the observer can observe a stereoscopic image.

What is lacking in the prior art is a display apparatus which can be selected to operate to provide 3D viewing.

SUMMARY OF THE INVENTION

An object of the present invention is to provide a display apparatus which can switch between a 2D display mode and a 3D display mode.

To achieve the above object, a display apparatus of the present invention includes a display panel having a plurality of pixels, a movable light shielding plate, and a light deflection plate. The light shielding plate is interposed between the display panel and the light deflection plate, and includes a plurality of strip-shaped transparent portions and strip-shaped non-transparent portions alternately arranged thereat. The light deflection plate includes a transparent substrate having a plurality of light deflection elements formed thereon. The light deflection elements are arranged in rows, which are spaced apart at predetermined intervals. The light deflection elements respectively correspond to individual pixels of the display panel. The light shielding plate can move along a direction perpendicular to the transparent portions. When the light shielding plate is positioned so that the transparent portions correspond to the light deflection elements, the light deflection elements operate to provide 3D images. When the light shielding plate is positioned so that the non-transparent portions correspond to the light deflection elements, the light deflection plate operates to provide 2D images. Thus the display apparatus can switch between a 3D display mode and a 2D display mode.

Other objects, advantages, and novel features of the present invention will become more apparent from the following detailed description when taken in conjunction with the accompanying drawings, in which:

DETAILED DESCRIPTION OF THE INVENTION

Figure 1:
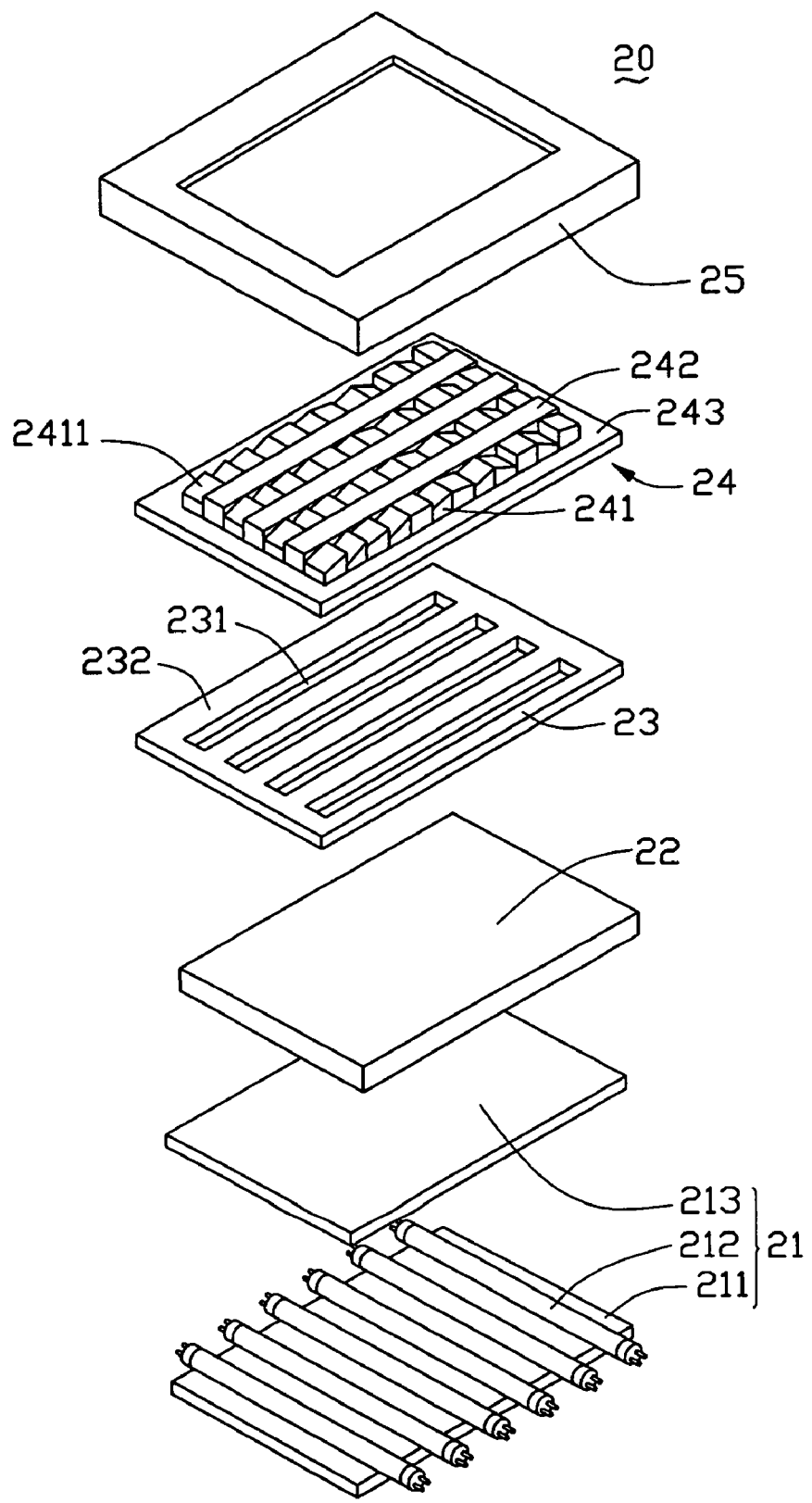
FIG. 1 is an exploded, isometric view of a display apparatus according to a first embodiment of the present invention.

Referring to FIG. 1, a display apparatus 20 according to the first embodiment of the present invention includes a panel frame 25, a plate-like light deflection member 24, a movable plate-like light shielding member 23, a liquid crystal display panel 22 as a source to provide images viewable in 2D and 3D respectively, and a backlight module 21.

The backlight module 21 is disposed under the liquid crystal display panel 22 to provide light beams for the liquid crystal display panel 22. The light shielding plate 23 and the light deflection plate 24 are disposed above the liquid crystal display panel 22 in that order from bottom to top. The panel frame 25 accommodates all the above-mentioned elements integrally.

The backlight module includes a reflective plate 211, a plurality of light sources 212 disposed on the reflective plate 211, and a diffusion plate 213 disposed on the light sources 212 to make light beams uniform before they enter the liquid crystal display panel 22. The light sources 212 are cold cathode fluorescent lamps (CCFLs).

The light shielding plate 23 is rectangular, and is made of an opaque material. The light shielding plate 23 defines a plurality of parallel strip-shaped transparent portions 231, which are spaced apart a predetermined uniform distance. The transparent portions 231 may be slits, or may comprise transparent material. Portions of the light shielding plate 23 other than the transparent portions 231 are non-transparent portions 232. A width of each transparent portion 231 is substantially equal to a diameter of each pixel of the liquid crystal display panel 22. The distance between two adjacent transparent portions 231 is greater than the width of each transparent portion 231. The light shielding plate 23 can move along a direction perpendicular to the transparent portions 231.

The light deflection plate 24 includes a transparent substrate 243, and a plurality of refracting portions 241 and flat portions 242 formed along a side surface of the transparent substrate 243. The refracting portions 241 and the flat portions 242 are strip-shaped, and arranged parallel to each other in alternating fashion. The flat portions 242 and the refracting portions 241 are made of a transparent material, such as polymethyl methacrylate (PMMA) or glass. A width of each flat portion 242 is substantially equal to the width of each transparent portion 231 of the light shielding plate 23. Each refracting portion 241 comprises a plurality of light deflection elements 2411, which have an appropriate size according to the size of the pixels of the liquid crystal display panel 22. That is, each light deflection element 2411 corresponds to one pixel. Each light deflection element 2411 has an inclined plane (not labeled) defining an inclined angle with respect to a horizontal surface (not labeled) of the transparent substrate 243. The inclined angles of the light deflection elements 2411 are set according to the refractive index of the light deflection elements 2411 and the positions of points A and B (see FIG. 2), such that the inclined angles of the different deflection elements 2411 have different values.

Figure 2:
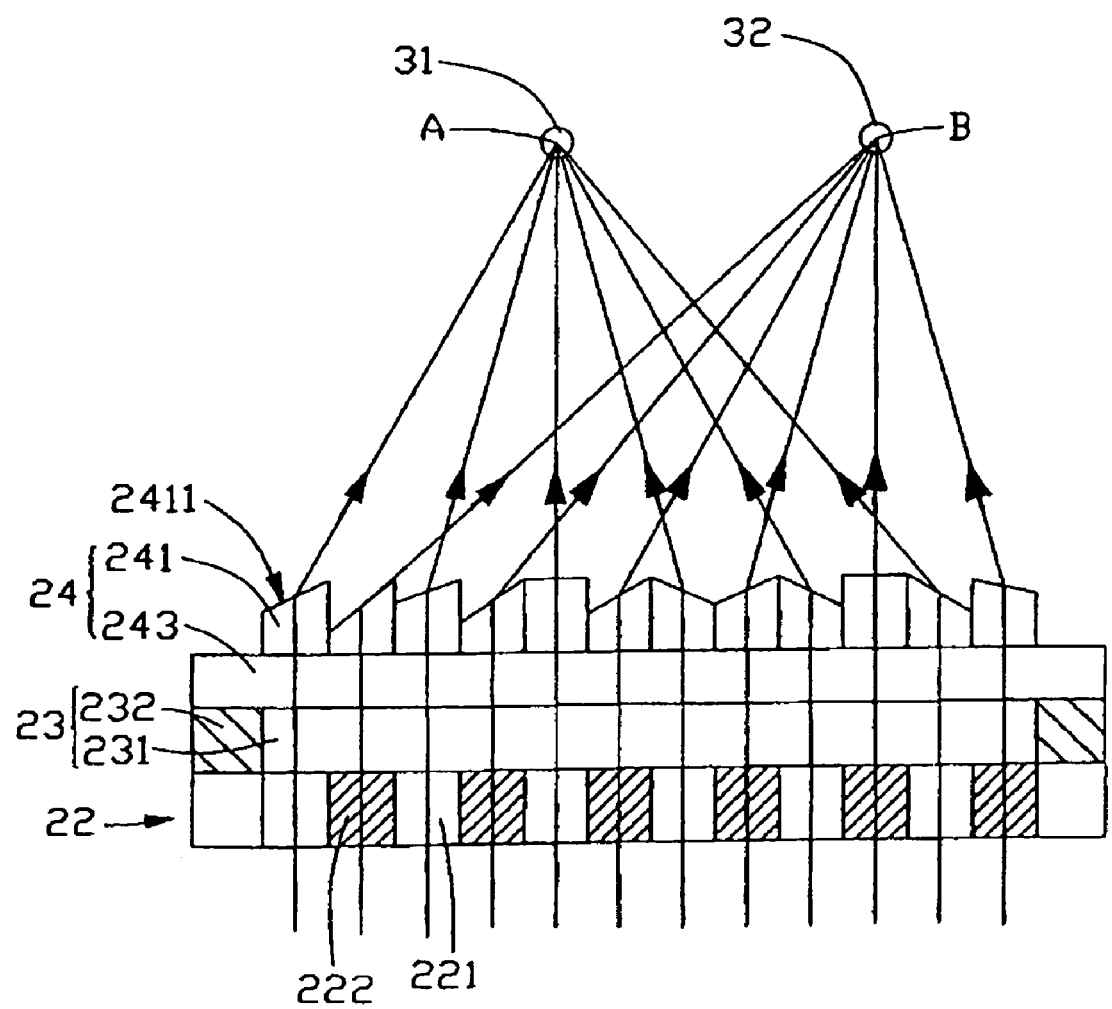
FIG. 2 is a schematic, side cross-sectional view of a light deflection plate and a display panel of the display apparatus of FIG. 1, showing essential optical light paths providing a stereoscopic view.

Referring to FIGS. 1 and 2, when the display apparatus 20 operates in a 3D mode, the light shielding plate 23 is moved to a position where the transparent portions 231 of the light shielding plate 23 correspond to the refracting portions 241 of the light deflection plate 24, and the non-transparent portions 232 of the light shielding plate 23 correspond to the flat portions 242 of the light deflection plate 24. In this position, the light deflection elements 2411 respectively correspond to odd pixels 221 and even pixels 222 of the liquid crystal display panel 22. Light beams emitted from the pixels 221 pass through corresponding light deflection elements 2411, and are refracted so as to converge to point A. Light beams emitted from the pixels 222 pass through corresponding light deflection elements 2411, and are refracted so as to converge to point B. Therefore, if a left eye 31 and a right eye 32 of an observer are located at points A and B respectively, the observer can observe a stereoscopic image without having to wear any viewing aids.

When the light shielding plate 23 is moved to a position where the transparent portions 231 are under the flat portions 242 of the light deflection plate 24, light beams emitted from the pixels 221, 222 pass through the flat portions 242 so as to converge to point A (left eye 31) as well as point B (right eye 32). Therefore, the observer can observe a 2D image. By setting the light shielding plate 23 to its two different predetermined positions, the display apparatus 20 can switch between a 2D display and a 3D display.

Figure 3:
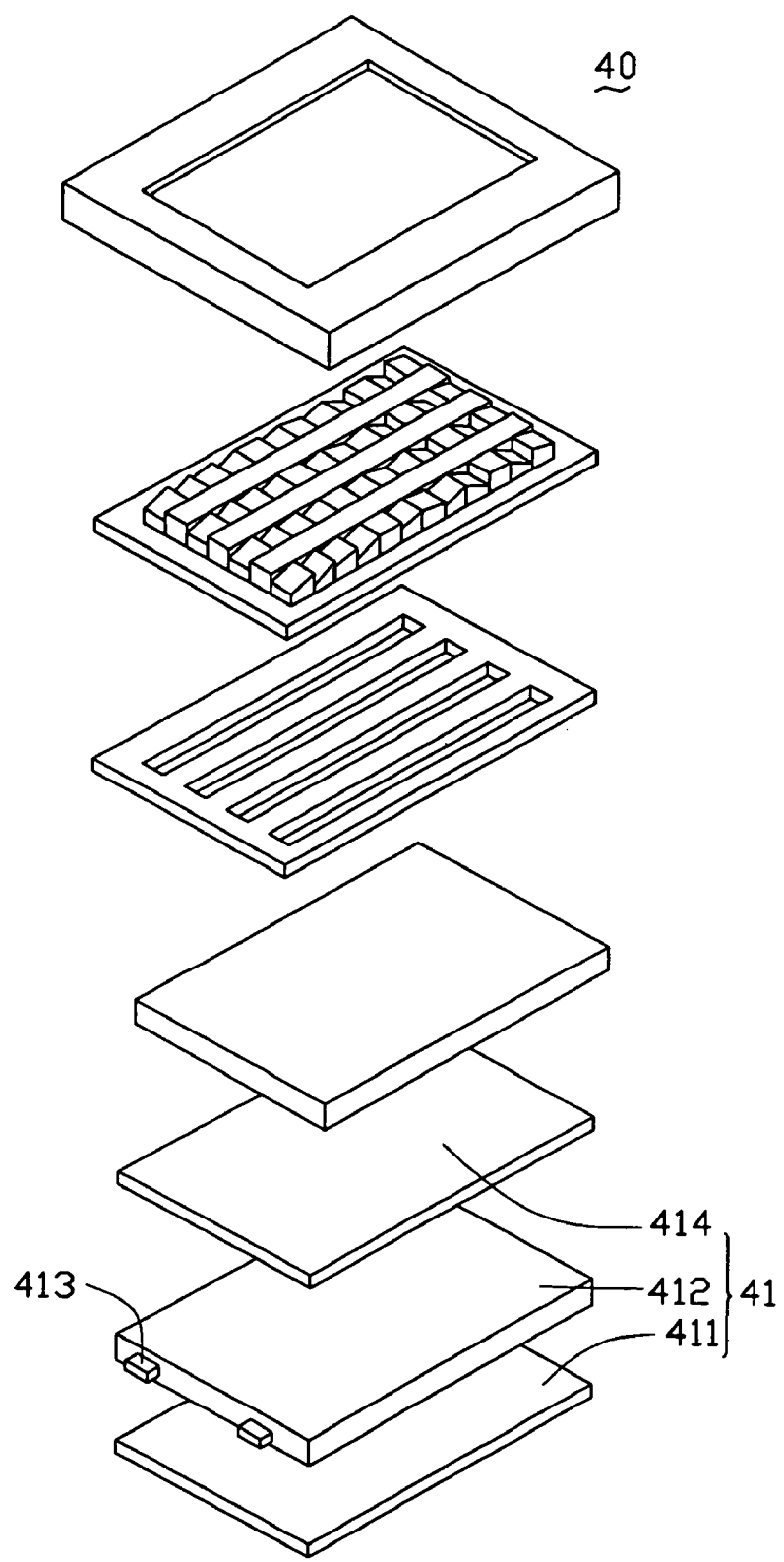
FIG. 3 is an exploded, isometric view of a display apparatus according to a second embodiment of the present invention.
Figure 4:
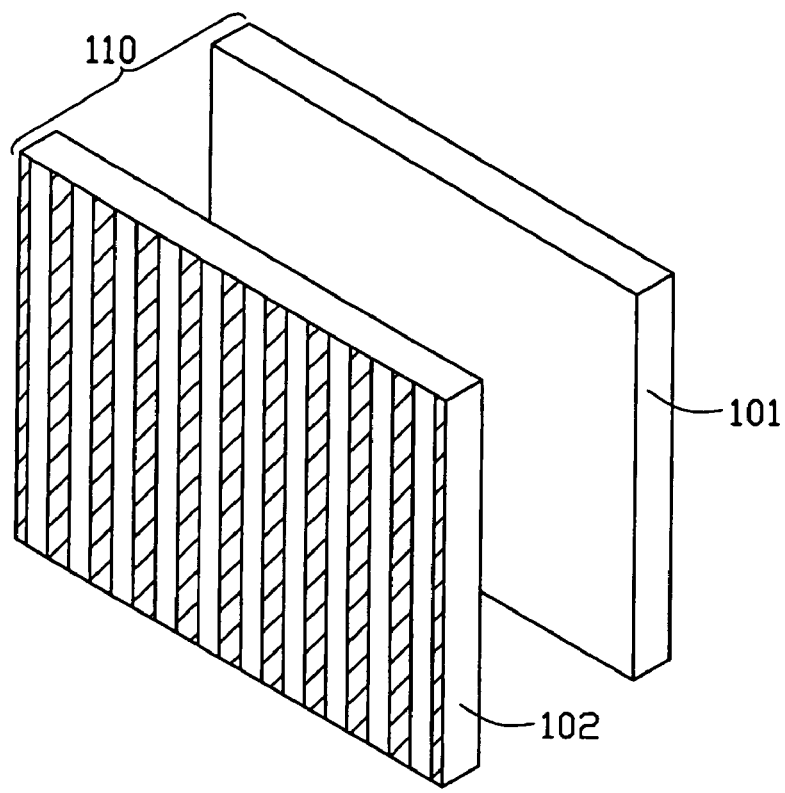
FIG. 4 is an exploded, isometric view of a stereoscopic image display section of a conventional 3D display apparatus.
Figure 5:
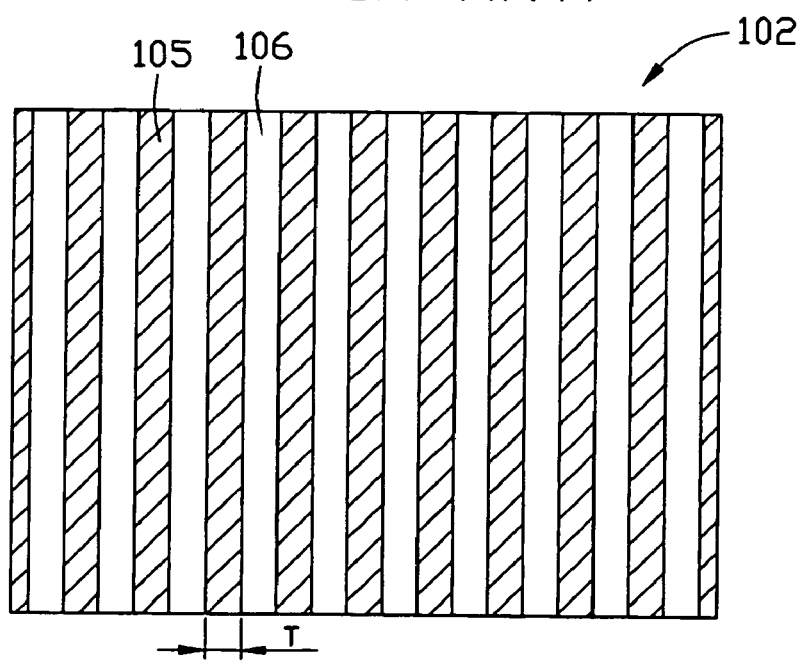
FIG. 5 is a front plan view of a slit array panel of the display section of FIG. 4.
Figure 6:
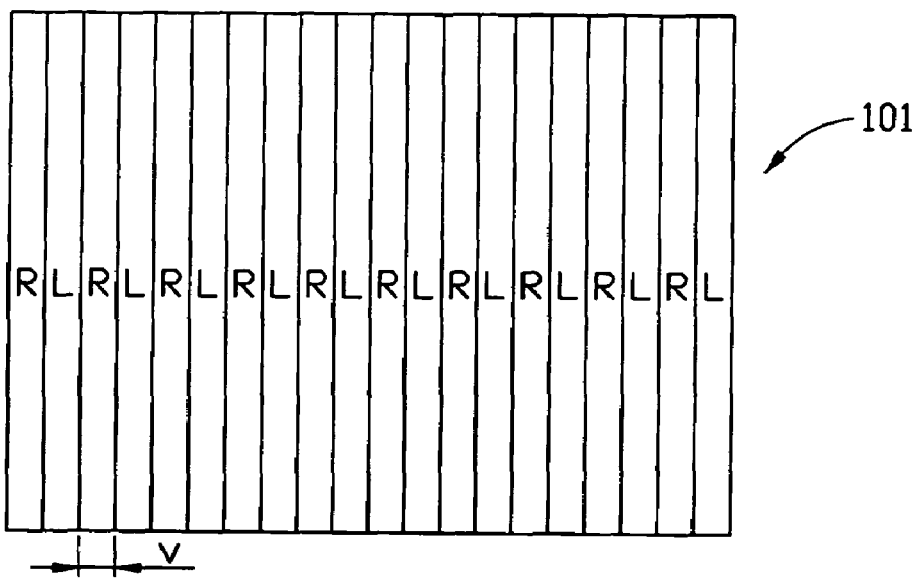
FIG. 6 is a front plan view of an image display panel of the display section of FIG. 4, showing strip-shaped image sections thereof.
Figure 7:
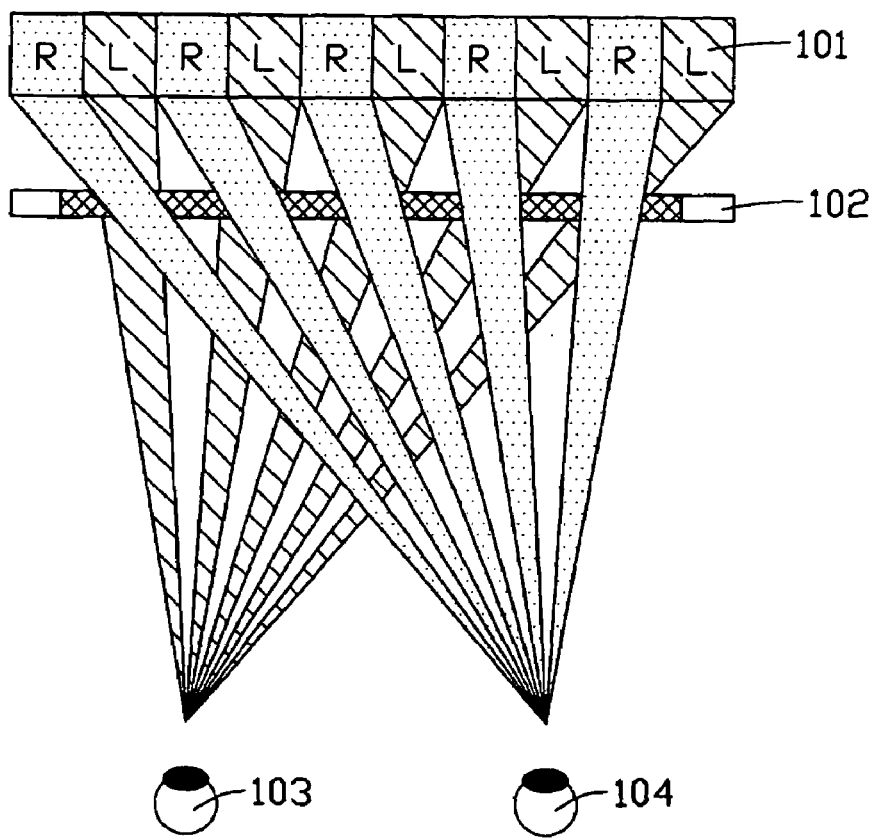
FIG. 7 is a top plan view of the display section of FIG. 4, showing essential optical light paths providing a stereoscopic view in a parallax image mode.

Referring to FIG. 3, this is a view of a display apparatus of a second embodiment of the present invention. The display apparatus 40 is similar to the display apparatus 20, except that a backlight module 41 comprises a reflective plate 411, a light guide plate 412, a pair of light sources 413, and a diffusion plate 414. The light sources 413 are disposed adjacent to an incident surface (not labeled) of the light guide plate 412. The light sources 413 are light emitting diodes (LEDs).

In alternative embodiments, the light deflection plate 24 can comprise a plurality of refracting portions 241 formed on the transparent substrate 243 thereof, but with the flat portions 242 omitted. With this configuration, when the display apparatus 20 operates in the 2D mode, light beams can pass through the transparent substrate 243 unaltered so as to converge to point A (left eye 31) as well as point B (right eye 32).

The liquid crystal display panel 22 of the present invention may be replaced by another display panel having a screen which independently displays each pixel, such as a cathode ray tube (CRT), a plasma display panel (PDP), or an electroluminescent display.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A display apparatus capable of switching between a two-dimensional image display mode and a three-dimensional image display mode, the display apparatus comprising:

a display panel having a plurality of pixels arranged in parallel lines;

a light deflection member disposed parallel to said display panel and having a surface parallel to said display panel, a plurality of light deflection elements distributing along said surface in parallel lines, the lines of light deflection elements being separated from each other by respective flat transparent portions, each one line of the light deflection elements and a corresponding adjacent flat transparent portion corresponding to a respective one of the lines of the pixels; and a movable light shielding member disposed between said light deflection member and said display panel, and having a plurality of parallel transparent portions, with each two neighboring transparent portions being separated by a non-transparent portion, so that image light from pixels with a left eye perspective image are converged by the light deflection elements via the transparent portions to a left eye position of an observer and image light from pixels with a right eye perspective image are converged by the light deflection elements via the transparent portions to a right eye position of the observer to provide the three-dimensional image display mode while said flat transparent portions are shielded by the non-transparent portions, and allow said plurality of pixels to be viewable in said two-dimensional image display mode via said transparent portions while the lines of light deflection elements are shielded by the non-transparent portions, viewing in said two-dimensional image display mode and said three-dimensional image display mode being selectable via parallel movement of said light shielding member with respect to said light deflection member.

2. The display apparatus as claimed in claim 1, wherein a width of each transparent portion is less than a width of each non-transparent portion.

3. A display apparatus comprising:

a display panel having an image source disposed therein, the image source comprising a plurality of pixels;

a light deflection member disposed in front of said display panel to have a surface parallel to said display panel, said light deflection member comprising a plurality of light deflection elements arranged aligned with said image source along said surface to receive images from said image source, said light deflection elements arranged in lines parallel to each other, each two adjacent lines of said light deflection elements being separated by a respective flat transparent portion of said light deflection member, each of said light deflection elements converging a corresponding portion of images from said image source to a first viewing point spaced from said surface, and at least two neighboring deflection elements of said each deflection element converging at least two corresponding portions of said images from said image source to a second viewing point spaced from said surface with a same distance as said first viewing point away from said surface; and a light shielding member movably disposed between said light deflection member and said display panel, said light shielding member having a plurality of transparent portions and a plurality of non-transparent portions alternately arranged therein, the plurality of transparent portions and the plurality of non-transparent portions configured to correspond to said light deflection elements and said flat transparent portions respectively so that image light from pixels with a left eye perspective image are converged by the light deflection elements via the transparent portions to a left eye position of an observer and image light from pixels with a right eye perspective image are converged by the light deflection elements via the transparent portions to a right eye position of the observer to provide a three-dimensional (3D) image mode when said light shielding member is located in a 3D image mode position relative to said light deflection member, the plurality of transparent portions and the plurality of non-transparent portions configured to correspond to said flat transparent portions and said light deflection elements respectively when said light shielding member is located in a two-dimensional (2D) image mode position relative to said light deflection member, said light shielding member being moveable between said 3D image mode position and said 2D image mode position along a path parallel to said light deflection member.

4. The display apparatus as claimed in claim 3, wherein a width of each transparent portion is less than a width of each non-transparent portion.

5. A display apparatus comprising:

a display panel comprising a plurality of pixels arranged in rows;

a light deflection plate comprising a substrate having a plurality of light deflection elements arranged in rows, the rows being spaced apart from each other by respective flat transparent portions of the light deflection plate, the flat transparent portions being provided at predetermined intervals between the rows, each of the light deflection elements corresponding to an individual pixel, each one row of the light deflection elements and a corresponding adjacent flat transparent portion corresponding to a respective one of the rows of pixels; and a light shielding plate disposed between the display panel and the light deflection plate, the light shielding plate having a plurality of elongate transparent portions and a plurality of elongate non-transparent portions alternately arranged thereat, the light shielding plate being selectively movable between a first position where the transparent portions are aligned with the light deflection elements and the non-transparent portions are aligned with the flat transparent portions so that image light from pixels with a left eye perspective image are converged by the light deflection elements via the transparent portions to a left eye position of an observer and image light from pixels with a right eye perspective image are converged by the light deflection elements via the transparent portions to a right eye position of the observer to provide a three-dimensional (3D) image display mode, and a second position where the non-transparent portions are aligned with the light deflection elements and the transparent portions are aligned with the flat transparent portions so as to provide a two-dimensional (2D) image display mode.

6. The display apparatus as claimed in claim 5, wherein the transparent portions and the non-transparent portions are strip-shaped.

7. The display apparatus as claimed in claim 5, wherein the light deflection elements have a corresponding size according to the size of the pixels.

8. The display apparatus as claimed in claim 5, wherein each of the light deflection elements has an inclined plane defining an inclined angle with respect to a main surface of the substrate.

9. The display apparatus as claimed in claim 5, wherein the light deflection elements are made of polymethyl methacrylate (PMMA) or glass.

10. The display apparatus as claimed in claim 5, wherein the transparent portions of the light shielding plate are slits formed in the light shielding plate.

11. The display apparatus as claimed in claim 5, wherein a width of each transparent portion is less than a width of each non-transparent portion.

12. The display apparatus as claimed in claim 5, wherein a width of each transparent portion is substantially equal to a diameter of each pixel of the display apparatus.

13. The display apparatus as claimed in claim 5, wherein each interval is substantially equal to the width of each transparent portion of the light shielding plate.

14. The display apparatus as claimed in claim 5, wherein when the light shielding plate is moved to the first position where the transparent portions of the light shielding plate correspond to the light deflection elements of the light deflection plate, light beams emitted from some of the light deflection elements are converged to a first observation position, and light beams emitted from the other light deflection elements are converged to a second observation position.

15. The display apparatus as claimed in claim 5, wherein the light shielding plate is made of an opaque material.

16. The display apparatus as claimed in claim 5, wherein the display panel is a liquid crystal display panel.

17. The display apparatus as claimed in claim 16, further comprising a backlight module, the backlight module comprising a plurality of light sources disposed on a reflective plate.

18. The display apparatus as claimed in claim 16, further comprising a backlight module, the backlight module comprising at least one light source adjacent an incident surface of a light guide plate.

19. The display apparatus as claimed in claim 5, wherein the display panel is a cathode ray tube (CRT), a plasma display panel, or an electroluminescent display.

20. The display apparatus as claimed in claim 5, wherein the light deflection elements are formed on a surface of the light deflection plate distal from the light shielding plate.

* * * * *